Figure 1:
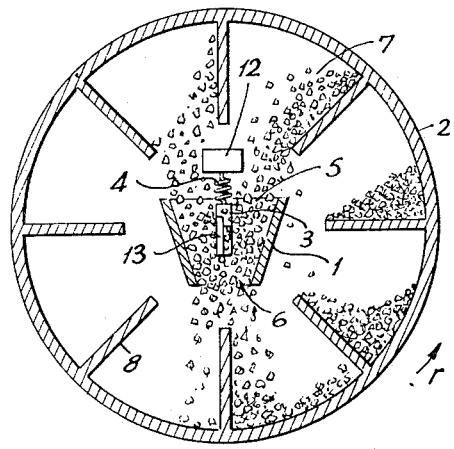

INVENTORS
LESLIE REGINALD BLAKE
JOHN RAYMOND HOWELLS

ATTORNEY

3,025,705
TEMPERATURE MEASURING APPARATUS

Leslie Reginald Blake and John Raymond Howells, Rugby, England, assignors to The British Thomson-Houston Company Limited, London, England, a British company Filed Feb. 4, 1957, Ser. No. 638,153
Claims priority, application Great Britain Feb. 3, 1956
5 Claims. (Cl. 73—343)

This invention relates to a means for measuring the temperature of flowing solid particle material, such as for instance stone chippings moving within or through a heater, and aims at providing an arrangement which is comparatively simple, yet makes it possible to measure the temperature of the material sufficiently accurate for the purpose in question, and with a minimum of time lag.

In certain applications, for instance when stone chippings are used in the preparation of asphalt or tar macadam, it is necessary to heat a great quantity of comparatively small bodies to a predetermined temperature. To this end the material is usually moved by gravity action through or within a heater. Such a heater may consist of a metal drum having a number of radial fins extending inwardly, to lift the chippings from the bottom to the top of the drum when it is rotated slowly. The heating can be either externally or internally, for example by a gas flame directed along the central aperture around which the fins extend towards the drum wall. Obviously the chippings stay in the lower half of the drum when it is stationary, as the drum rotates they are lifted with the compartments formed by the fins, until gravity causes the chippings to fall or flow into the lower compartments, and so on.

Under such conditions the invention affords an improved means for obtaining a rapid and reliable indication of the average temperature of the material by measuring the temperature of a small portion of the flow which is directed through a passageway containing a temperature sensitive element such as a thermocouple or a thermistor.

Generally this invention resides in apparatus for measuring the temperature of flowing solid particle material comprising a passage for branching off and returning to a main flow thereof a small quantity of the material, a temperature sensitive element being resiliently supported in the branch stream to contact directly the particles with the least obstruction to the flow of said stream.

In a practical embodiment the area of the outlet opening of the passage is restricted or contracted as compared with that of the inlet opening in order to direct the movement of solid particles towards the temperature sensitive member situated substantially centrally in the branch flow, thus to cause an accumulation of the material which ensures effective heat conducting contact with the temperature sensitive element, or an enclosure protecting the element. The passageway is stationary in or external to the heater and may be of funnel shape, and the temperature sensitive element is suspended within the channel, by a resilient means, such as a coiled spring, for instance.

Figure 2:
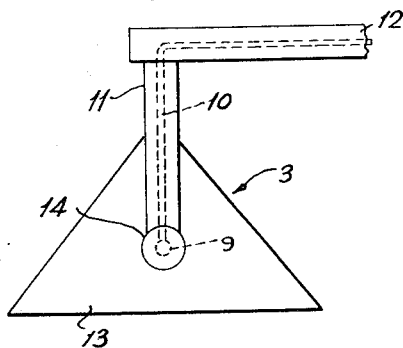

More details will become apparent from the accompanying drawing which shows diagrammatically and by way of example a preferred embodiment of the invention, and in which:

FIG. 1 shows the use of the invention with a rotating drum heater for stone chippings; and FIG. 2 shows a structural detail.

According to FIG. 1 a funnel shaped passageway 1 is arranged stationary in the rotating drum 2, while a temperature sensing unit 3 is suspended by a coiled spring 4 to be positioned within the passageway 1. The heating drum 2 may be of any conventional design, comprising for instance fins 8, which lift the material as the drum rotates in the direction r towards the opening 5 at the top of the passageway 1. As can be seen, the passageway tapers downwardly so that the area of the outlet opening 6 is smaller than that of opening 5. Thus the material 7, which comprises small particles, accumulates in the passageway 1 and comes into close heat conducting contact with the temperature sensitive unit 3 since the weight of the particles in the passage which narrows downwards from the inlet to the outlet provides a component force parallel to the passage wall which moves the particles downwardly along the passage wall to the passage outlet and also a right-angle force component, the particles are crowded towards the temperature sensitive member, thereby reducing the empty spaces between the particles and ensuring maximum contact between the particles and the temperature sensitive member.

As shown in FIG. 2 the unit 3 may comprise a thermocouple or a thermistor 9 connected by leads 10 to a measuring circuit (not shown). The leads are protected by a tube 11, FIG. 2, fixed to a hollow stationary support 12, a free portion of the leads 10 being threaded through the spring 4 which is also situated in tube 11 but not shown in FIG. 2.

In order to reduce to a minimum time lag and provide for rapid heat conduction between the material and the temperature sensitive element the heat transfer surface can be increased. To this end, the temperature sensitive member can be mounted on a plate 13 of small mass and of a material which ensures good heat conduction yet has a low specific heat value per unit volume, such as silver, brass or molybdenum. The size of the plate may be about one to two inches square.

Modifications are possible without departure from this invention. Where abrasion must be expected a protecting enclosure 14 can be provided for the sensitive element 9 and such enclosure may be joined by brazing for instance to the plate 13 as shown in FIG. 2. The space between the element and this enclosure can be filled with a material of high heat conductivity in order to reduce the time lag.

It will also be understood that the electrical signal which is obtained can serve for a variety of purposes so that the invention is applicable to systems for indicating the temperature of a material as above described, or for controlling the heating of the material, or the flow of material, for example the rotation of the drum, or the supply to and discharge from the heater.

From the batch heater before described by way of example the chippings are discharged periodically by tipping the discharge chute, and the apparatus of the invention is shown inside the heater. However, the use of the measuring apparatus according to this invention is not so limited. It may be located in any flow of material for its temperature measurement, outside or inside a heater or a cooler, for instance. Obviously in a continuous heater the chippings would progress along an inclined drum so that there is a continuous output of heated chippings from the end, and the member 1 could be arranged in the flow from the discharge of the drum, that is outside the drum.

What we claim is:

1. An arrangement for measuring the temperature of small solid particles comprising means for supplying a main flow of particles having a horizontal component of progress, a temperature sensitive member, a support for said member, a stationary member forming a passage having an inlet opening substantially smaller than the cross-section of the main flow and an outlet opening smaller than said inlet opening, said two openings being connected together by a continuous wall steadily converging from the inlet to the outlet opening and said passage having a generally vertical main axis, said support for said member being resilient and arranged to support said temperature sensitive member near said axis, said supply means comprising means for lifting solid particles out of said main flow and discharging such particles generally towards said passage inlet opening.

2. An arrangement as claimed in claim 1, wherein the wall of the passage has frusto-conical shape.

3. An arrangement as claimed in claim 1, wherein the outer surface of said temperature sensitive member is extended to increase the number of contact points between said surface and said particles.

4. An arrangement as claimed in claim 1, wherein the resilient support comprises a coil spring situated between the temperature sensitive member and a stationary point above it to serve as a suspension means.

5. An arrangement as claimed in claim 1, wherein said supply means comprises a rotating drum and said lifting means comprising longitudinal fins on said drum projecting inwardly from the surface thereof, said drum being arranged to contain the main flow of material and the axis of said drum being sloping, the radial projection of said fins being shorter than the radius of said drum, and said stationary passage member being situated in the central open space formed between the inner ends of said fins.

References Cited in the file of this patent

UNITED STATES PATENTS

| | | |
|---|---|---|
| 1,224,385 | Kennedy | May 1, 1917 |
| 1,898,890 | Perry | Feb. 21, 1933 |
| 1,869,788 | West | Aug. 2, 1932 |
| 2,252,387 | Schmidt | Aug. 12, 1941 |
| 2,263,402 | Stafford | Nov. 18, 1941 |
| 2,316,208 | Woodruff | Apr. 13, 1943 |
| 2,383,729 | Loy | Aug. 28, 1945 |
| 2,666,799 | Barsy | Jan. 19, 1954 |
| 2,709,843 | Hartley | June 7, 1955 |
| 2,739,035 | Regier | Mar. 20, 1956 |
| 2,796,455 | Jones | June 18, 1957 |

FOREIGN PATENTS

| | | |
|---|---|---|
| 26,321 | Sweden | Feb. 6, 1909 |
| 1,146,647 | France | May 27, 1957 |
| 1,020,465 | Germany | Dec. 5, 1957 |